United States Patent
Schmitz

(10) Patent No.: US 10,906,462 B2
(45) Date of Patent: Feb. 2, 2021

(54) TRIM ARRANGEMENT FOR A VEHICLE INTERIOR

(71) Applicant: Dr. Ing. h.c. F. Porsche Aktiengesellschaft, Stuttgart (DE)

(72) Inventor: Stefan Schmitz, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/897,302

(22) Filed: Jun. 10, 2020

(65) Prior Publication Data
US 2020/0398746 A1  Dec. 24, 2020

(30) Foreign Application Priority Data

Jun. 18, 2019 (DE) .................. 10 2019 116 500

(51) Int. Cl.
*B60Q 1/00* (2006.01)
*B60Q 3/74* (2017.01)
*B60R 13/02* (2006.01)
*B60Q 3/62* (2017.01)
*B60Q 3/217* (2017.01)

(52) U.S. Cl.
CPC ............. *B60Q 3/74* (2017.02); *B60Q 3/217* (2017.02); *B60Q 3/62* (2017.02); *B60R 13/0243* (2013.01); *B60R 2013/0287* (2013.01)

(58) Field of Classification Search
CPC ........... A63B 37/0004; A63B 37/0005; A63B 37/002; A63B 37/0016; A63B 37/0019; A63B 37/0015

USPC .......................................................... 362/488
See application file for complete search history.

(56) References Cited

U.S. PATENT DOCUMENTS

| 8,720,939 | B2 * | 5/2014 | Schmitz | B60R 13/0243 |
| | | | | 280/728.3 |
| 9,469,246 | B1 * | 10/2016 | Gold | B60Q 1/34 |
| 10,272,832 | B2 * | 4/2019 | Xu | B60Q 3/54 |
| 10,507,764 | B2 * | 12/2019 | Schneider | B60Q 3/14 |

FOREIGN PATENT DOCUMENTS

EP  2063057 A1  5/2009

* cited by examiner

*Primary Examiner* — Ali Alavi
(74) *Attorney, Agent, or Firm* — Leydig, Voit & Mayer, Ltd.

(57) ABSTRACT

A trim arrangement for a vehicle interior includes a trim portion having a through-opening for delimiting the vehicle interior and a light-emitting body inserted into the through-opening. The light-emitting body is configured to transmit light and/or light signals into the vehicle interior, and blocks a movement transversely to an opening normal of the through-opening in a form-fitting manner. The trim arrangement further includes a receiving device connected to a rear side of the trim portion, the rear side facing away from the vehicle interior, and a latching body inserted into the receiving device along an insertion direction extending transversely to the opening normal. The receiving device blocks a movement of the latching body in a direction of the opening normal in a form-fitting manner. The trim arrangement additionally includes a connecting strip provided on the rear side of the trim portion and extending transversely to the opening normal.

11 Claims, 3 Drawing Sheets

US 10,906,462 B2

TRIM ARRANGEMENT FOR A VEHICLE INTERIOR

CROSS REFERENCE TO RELATED APPLICATIONS

This application claims benefit to German Patent Application No. DE 10 2019 116 500.8, filed Jun. 18, 2019, which is hereby incorporated by reference herein.

FIELD

The invention relates to a trim arrangement for a vehicle interior, with the aid of which the vehicle interior can be delimited in a visually appealing manner.

BACKGROUND

EP 2 063 057 A1 discloses a trim arrangement for a vehicle interior, in which a rail-type light guide of physically separate clamping elements is pressed against a rear side of a trim portion facing the vehicle interior, wherein extensions of the light guide are placed into corresponding holes in the trim portion so as to be able to output the light that is injected into the light guide from a light source into the vehicle interior.

SUMMARY

In an embodiment, the present invention provides a trim arrangement for a vehicle interior. The trim arrangement includes a trim portion having a through-opening for delimiting the vehicle interior and a light-emitting body inserted into the through-opening. The light-emitting body is configured to transmit light and/or light signals into the vehicle interior, and blocks a movement transversely to an opening normal of the through-opening in a form-fitting manner. The trim arrangement further includes a receiving device connected to a rear side of the trim portion, the rear side facing away from the vehicle interior, and a latching body inserted into the receiving device along an insertion direction extending substantially transversely to the opening normal of the through-opening. The receiving device blocks a movement of the latching body in a direction of the opening normal of the through-opening in a form-fitting manner. The trim arrangement additionally includes a connecting strip provided on the rear side of the trim portion and extending substantially transversely to the opening normal of the through-opening. The light-emitting body and the latching body are connected at a distance from one another by the connecting strip. The connecting strip is embodied to be elastically bendable in the direction of the opening normal of the through-opening.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
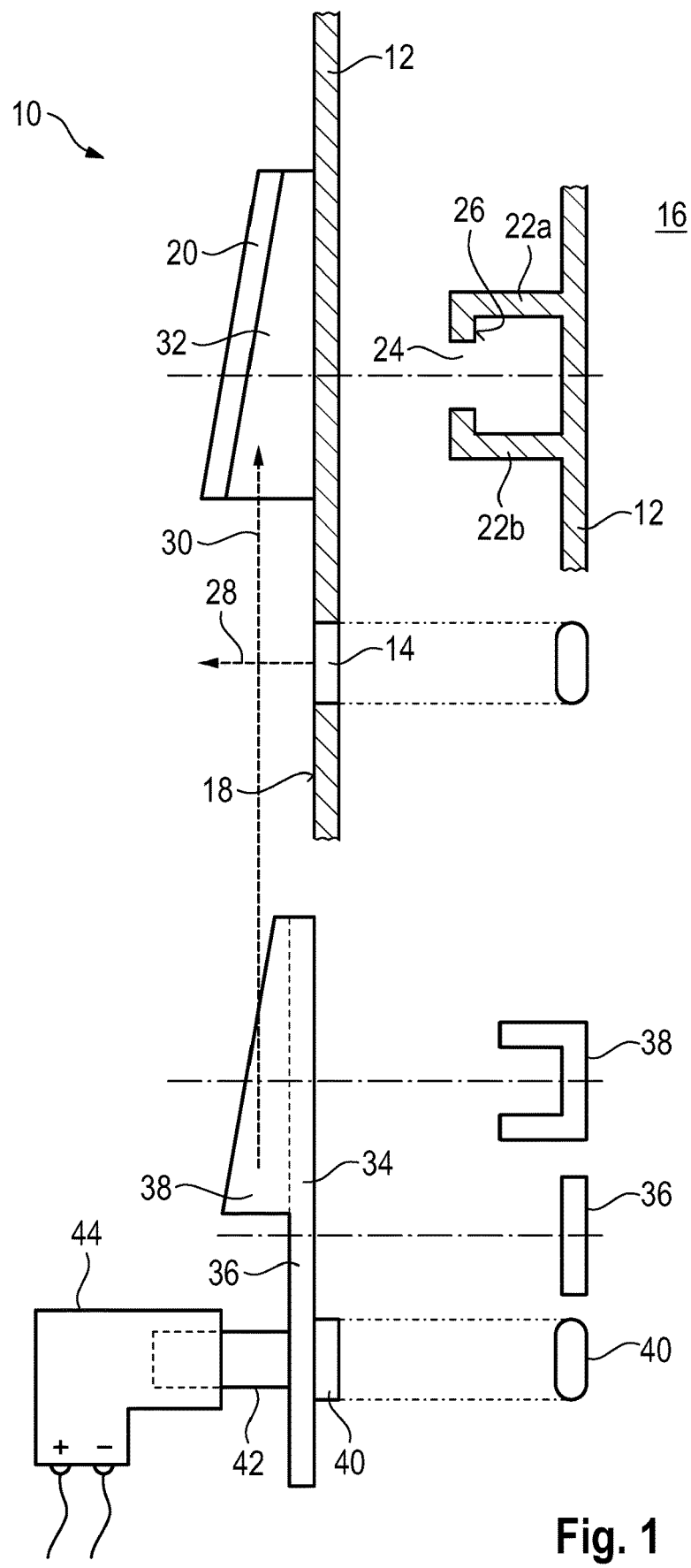
FIG. 1 shows a schematic sectioned exploded view of a trim arrangement.

There is a constant need to design a vehicle interior of a motor vehicle in a visually appealing manner with little outlay. The present disclosure provides measures for making possible a simple, cost-effective, and visually appealing design of a vehicle interior.

According to the disclosure, a trim arrangement for a vehicle interior is provided, having a trim portion, which has a through-opening, for delimiting the vehicle interior, a light-emitting body, which has been inserted into the through-opening, for transmitting light and/or light signals into the vehicle interior, wherein the light-emitting body blocks a movement transversely to the opening normal of the through-opening in a form-fitting manner, a receiving device connected to a rear side of the trim portion, which rear side faces away from the vehicle interior, a latching body, which has been inserted into the receiving device along an insertion direction extending substantially transversely to the opening normal of the through-opening, wherein the receiving device blocks a movement of the latching body in the direction of the opening normal of the through-opening in a form-fitting manner, and a connecting strip that is provided on the rear side of the trim portion and extends substantially transversely to the opening normal of the through-opening, wherein the light-emitting body and the latching body are connected at a distance from one another by way of the connecting strip, which is embodied to be elastically bendable in the direction of the opening normal of the through-opening.

The latching body, the light-emitting body, and the connecting strip can form a light-guide body via which light emitted by a light source can be output into the vehicle interior so as to produce a visually appealing design of the vehicle interior by way of light effects and/or to provide information to the vehicle occupants relating to a specific vehicle state by way of a light signal. Owing to the latching body, which has been inserted in the receiving device, a relative movement of the light-guide body along the opening normal of the through-opening can be blocked and, owing to the light-emitting body that has been inserted into the through-opening, a relative movement transversely to the opening normal of the through-opening can additionally be blocked. This makes a reliable fastening, which is preferably fixed against movement, of the light-guide body to the trim portion possible. The trim arrangement can consequently also be easily installed as a common structural unit, for example as an interior trim of a vehicle door or of another component of the motor vehicle, without the possibility of the light-guide body becoming accidentally detached. In order to enable a substantially rattle-free attachment and permit good mountability, the latching body is deliberately positioned at a significant distance from the light-emitting body and a flexibility of the connecting strip extending between the latching body and the light-emitting body is exploited. During the installation, the light-guide body can be placed onto the rear side of the trim portion and be displaced transversely with respect to the opening normal of the through-opening along the insertion direction in order to thread the latching body into the receiving device. The receiving device preferably has a for example funnel-shaped entrance region that makes it easier to thread the latching body into the receiving device. The receiving device here forces the latching body into a defined relative position, in particular one in which it rests against the rear side of the trim portion, along the opening normal of the through-opening, which can correspond to the surface normal of the rear side. Before reaching the intended end position along the insertion direction, the light-emitting body rests against the rear side of the trim portion and in the process bends the connecting strip, in particular only within its elastic region below its yield strength and plastic limit. Once the latching body has reached its intended end position at the end of the insertion direction, the light-emitting body is positioned over the through-opening, with the result that the light-emitting body can elastically snap and/or be pushed into the through-opening. By arranging the light-emitting body at a distance from the latching body via the elastic connecting strip, simple and cost-effective installation and a visually appealing design of a vehicle interior are made possible.

In particular, the connecting strip is embodied to be elastically bendable at least by a distance corresponding to an extent by which the light-emitting body is removed from the connecting strip in the direction of the opening normal of the through-opening. The light-emitting body projecting from the connecting strip can in particular have an extent along the opening normal of the through-opening that corresponds to the material thickness of the trim portion, with the result that preferably the surface of the light-emitting body that faces the vehicle interior is substantially surface-flush with the surface of the trim portion facing the vehicle interior in a common plane. However, it is also possible that the light-emitting body is slightly recessed in the through-opening or protrudes somewhat out of the through-opening into the vehicle interior. The connecting strip thereby only needs to be bent to a minor extent. Therefore, a low elasticity is already sufficient for the connecting strip, which means that the connecting strip does not need to be made from an elastomer. In fact, the connecting strip can be made from a comparatively hard material. Since the connecting strip is bent only during the installation, it is even possible to allow a remaining proportion of a plastic deformation for the connecting strip after the bending, for example 0.2% or even 1% to 2% of plastic deformation of the overall deformation. The connecting strip can therefore be made for example from a plastic and/or glass.

The latching body is preferably able to be wedged into the receiving device in the insertion direction in a frictionally locking manner. The receiving device and/or the latching body can be configured to have the shape of a wedge or like a pyramid for example along the insertion direction such that the latching body can be clamped into the receiving device in its intended end position. It is thus possible to eliminate any play along the opening normal of the through-opening, which makes it possible for rattling to be avoided and for the light-guide body to be retained such that it is fixed against movement. Rotation of the light-guide body about the light-emitting body that has been inserted into the through-opening can be blocked by the receiving device in a frictionally locking and/or form-fitting manner. The receiving device can have, for example, at least one L-shaped leg, which at least partially engages around the latching body and forms a stop that can block a lifting movement of the latching body from the rear side of the trim portion. The latching body can be wedged to the stop, wherein the size of the friction faces the rest against one another can be specified by the shape of the stop and of the latching body. It is also possible that the latching body rests laterally against the legs and is preferably wedged thereto to increase the size of the effective friction faces. In addition, the latching body can rest flat on the rear side, as a result of which a further friction pairing is produced. For example, the receiving device and/or the latching body have for example a U-shaped cross section or the cross section of a dovetail joint to avoid a friction face that is too large. The latching body that is wedged into the receiving device has been inserted into the receiving device in particular in a self-locking manner.

With particular preference, the latching body is lockable substantially immovably by way of a catch in the receiving device. In addition or alternatively to a friction fit, the latching body can be locked in a form-fitting manner against slipping out in the direction opposite the insertion direction using the catch in the receiving device. The catch can in particular be inserted in the receiving device in particular in a manner in which loss is prevented. The catch can be embodied for example in the form of a latching tongue of a clip connection of the latching body to the receiving device. For example, the receiving device is made from a plastics material and has the catch, which is in the form of a latching tongue, in one piece, wherein the latching tongue can slide down the latching body with elastic preloading during the insertion of the latching body into the receiving device until the latching tongue can snap into a depression in the latching body and can block a backward movement of the latching body in a form-fitting manner.

In particular, the latching body, the connecting strip, and the light-emitting body are made in one piece from a light-guiding material. The latching body, the light-emitting body, and the connecting strip can form a one-piece light-guide body, which is made for example from an at least translucent, preferably substantially transparent, plastic and/or glass. A loss of luminosity beyond phase limits, which could occur between a light source and the light-emitting body on account of a multi-piece configuration, is avoided.

The light-emitting body and the coupling element are preferably arranged on the connecting strip such that they lie opposite one another. The light-emitting body can consequently face the vehicle interior and be perceived by a vehicle occupant, while the optical coupling of the light signals, which are output into the vehicle interior via the light-emitting body, can be accommodated outside the vehicle interior and within the trim portion. The light-emitting body and the coupling element can project from the resilient connecting strip on different sides and consequently ensure simple snapping into the through-opening as soon as the intended end position has been reached.

In particular, a light source is optically coupled to the light-emitting body, wherein in particular a light-guiding coupling element that is connected to the light-emitting body and to the light source projects from the connecting strip. The light source can, for example, have at least one LED to produce light beams and/or flashing light signals that provide information relating to a specific vehicle state to the vehicle occupants. The coupling element, which is configured in particular in one piece with the light-emitting body, can make possible optical coupling and preferably mechanical attachment of the light source to the coupling element at a slight distance from the connecting strip, with the result that the light source cannot so easily be affected and/or break off in the case of a bending of the connecting strip during the installation. It is additionally possible to easily couple the light source to the light-guide body at a defined and easily findable location after the installation of the light-guide body.

With particular preference, a portion of the connecting strip projects from the light-emitting body on a side that faces away from the latching element. The connecting strip can consequently overlap somewhat, with the result that the connecting strip can project from the light-emitting body to a significant extent at least on two sides and rest against the rear side of the trim portion. An inclined position of the light-emitting body within the through-opening can consequently be easily detected during the installation and be intuitively corrected. It is sufficient during the installation if the connecting strip rests against the rear side on at least two sides of the light-emitting body so as to be able to ascertain the correct insertion of the light-emitting body in the through-opening.

In particular, the connecting strip and/or the latching body rests flat against the rear side of the trim portion. Due to the flat orientation, tilting of the light-guide body about its longitudinal axis can be avoided. In addition, an intuitive sliding face is produced over which the light-guide body can slide if the latching body is threaded into the receiving device along the insertion direction.

The receiving device preferably blocks a movement of the latching body transversely to the insertion direction. Rotation of the light-guide body about the light-emitting body that has been inserted into the through-opening can consequently be reliably avoided in a form-fitting manner in the region of the receiving device. The end position of the light-guide body can thereby be substantially fixed against movement.

With particular preference, the light-emitting body is pressed into the through-opening substantially without play. It is possible here to exploit the fact that the trim portion can generally be made from a plastics material that is soft enough to easily press in the at least translucent material, which is generally more likely to be harder, of the light-emitting body. A joint between the light-emitting body and the material, which surrounds the light-emitting body, of the trim portion is thus avoided, thus improving the visual appearance.

The trim arrangement 10 shown in FIG. 1 has a trim portion 12 having a through-opening 14, with the rear side 18, which faces away from the vehicle interior 16, being provided with a receiving device 20 in the form of a guide rail. The receiving device 20 can have, for example, two legs 22a, 22b, which are located opposite from one another at a distance, are L-shaped in cross section and, owing to their mirror-symmetric arrangement, together form a groove 24 with an undercut 26, which represents a stop that is effective in the direction of an opening normal 28 of the through-opening 14. Alternatives for the cross-sectional contour of the receiving device 20, which are not shown in FIG. 1, exist for example in the form of a dovetail geometry or of a closed profile. Furthermore, the longitudinal extent of the receiving device 20 can be inclined with respect to the rear side 18, which faces away from the vehicle interior 16, with the result that the cross section of the receiving device 20 becomes wider toward the through-opening 14 in the direction opposite an insertion direction 30 and, consequently, a receiving space 32, which is substantially in the form of a wedge or a truncated pyramid, is produced within the receiving device 20.

In addition, a light-guide body 34 is provided, which is made in its entirety from a light-guiding transparent and flexible material. The light-guide body 34 has a connecting strip 36, which substantially corresponds to a flat bar. In addition, the light-guide body 34 has, at one end of the connecting strip 36, a latching body 38 as a structure, which corresponds to the receiving space 32 present in the receiving device 20 in a form-fitting manner. An additional feature of the light-guide body 34 is a coupling element 42, which likewise faces away from the vehicle interior 16, is connected, at a distance from the latching body 38, to the connecting strip 36, which has the shape of a flat bar, protrudes along the opening normal 28, and to which a light source 44, which is embodied for example in the form of an LED module, can be fixed, wherein this can be done in a form-fitting, integrally bonded and/or force-fitting manner. In addition, the light-guide body 34 is provided, in an extension of the coupling element 42, to a light-emitting body 40, which protrudes toward the vehicle interior 18, with the result that a center point of a front-side outline contour of the light-emitting body 40 and the center point of the cross section of the coupling element 42 are preferably located on one axis, which is substantially identical to the direction of the light transport from the light source 44, via the surface of the light-emitting body 40 through which the light travels, into the vehicle interior 16. In addition, the front-side outline contour of the light-emitting body 40 of the light-guide body 34 corresponds to the contour of the through-opening 14 in the trim portion 12 in a manner such that the light-emitting body 40 can engage into the through-opening 14 preferably without play.

Figure 2:
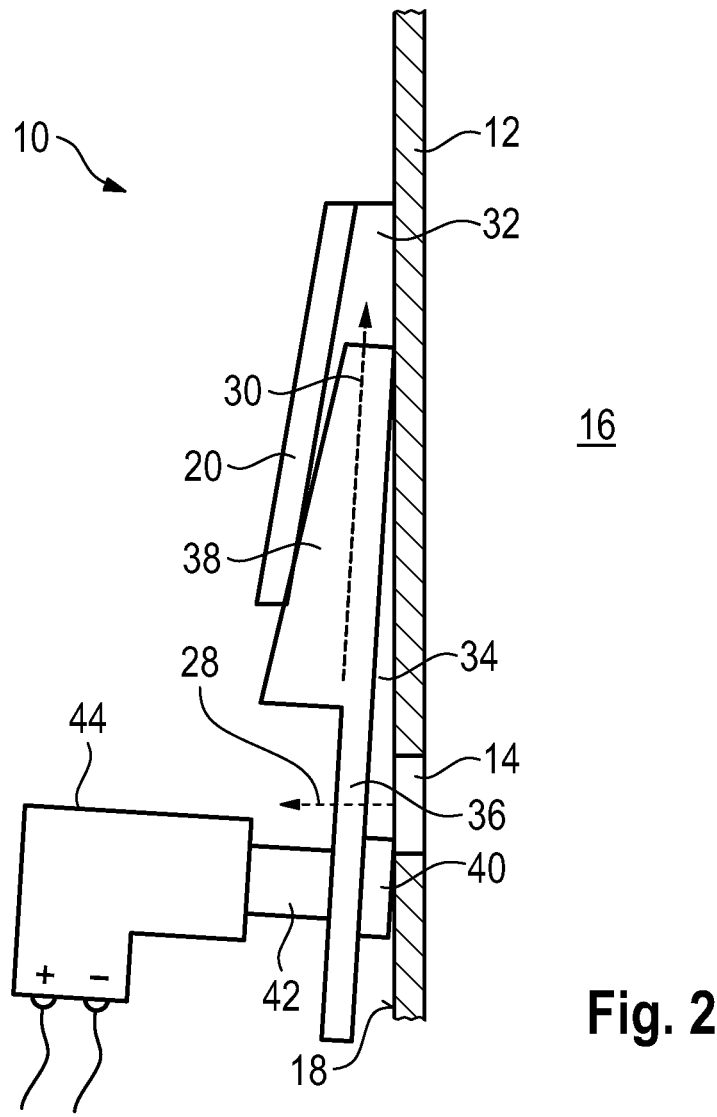
FIG. 2 shows a schematic sectional view of the trim arrangement from FIG. 1 during installation.

FIG. 2 shows the installation process of the light-guide body 34 that was already provided with the light source 44 in advance, in which initially the form-fit between the latching body 38 of the light-guide body 34 and the receiving space 32, which is bounded by the receiving device 20, is produced. In this context, the principle of a receiving space 32 that is in the shape of a wedge or a truncated pyramid, geometrically corresponds to the latching body 38 of the light-guide body 34, and is produced when the cross section of the receiving device 20 becomes wider along its longitudinal extent in the direction opposite to the installation direction 30 of the light-guide body 34 has a beneficial effect on the installation process. The resulting centering effect between the latching body 38 of the light-guide body 34 and the receiving device 20 in the trim portion 12 ensures that the latching body 38 can be slid into the receiving device 20 without a significant exertion of force and, once the form-fit between the light-emitting body 40 and the through-opening 14 in the trim portion 12 takes place, a tolerance-insensitive and possibly self-locking end-position lock of the light-guide body 34 in the trim portion 12 is ensured.

Figure 3:
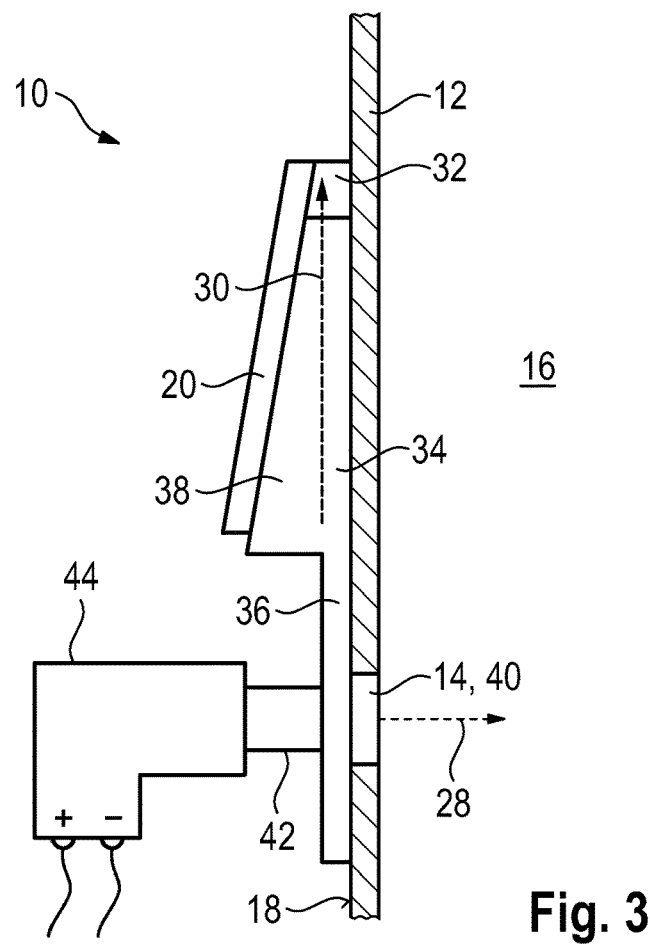
FIG. 3 shows a schematic sectional view of the trim arrangement from FIG. 1 after installation.

During the installation of the light-guide body 34 into the trim portion 12, the surface of the light-emitting body 40 that faces the vehicle interior 16 is pressed increasingly against the rear side 18 of the trim portion 12 that faces away from the vehicle interior 16 as the influence of the form-fit between the latching body 38 and the receiving device 20 in accordance with FIG. 2 increases and, consequently, a middle region of the connecting strip 36, which is in the form of a flat bar, is subjected to progressive bending, characterized by an elastic restoring capacity, up until the end position of the light-guide body 34 in the trim portion 12 is reached. Once the end position of the light-guide body 34 in the trim portion 12 has been reached, the light-emitting body 40 of the light-guide body 34 has been brought into alignment with the through-opening 14 in the trim portion 12 so that, owing to its elastic restoring capacity, the bent middle region of the connecting strip 36, which is in the shape of a flat bar, springs back into its starting position, which is defined by the tool-based primary forming of the light-guide body 34, and, in the process, the light-emitting body 40 of the light-guide body 34 latches into the through-opening 14 in the trim portion 12, as shown in FIG. 3. Owing to this form fit, which can be supported by a force fit owing to elastic restoring residual capacities of the middle region of the connecting strip 36, which is in the shape of a flat bar, the light-guide body 34 in its end position is reliably locked in the trim portion 12. Consequently, the light-emitting body 40 of the light-guide body 34 not only performs the task of transferring light from the light source 44 into the vehicle interior 16 in front of the vehicle occupants, but also performs, in combination both with the form fit between the latching body 38 of the light-guide body 34 and the receiving space 32 of the receiving device 20 and also with the elastic restoring capacity of the middle region of the connecting strip 36, which is in the shape of a flat bar, the function of resilient snap-fastening for the end position lock of the light-guide body 34 in the trim portion 12.

Figure 4:
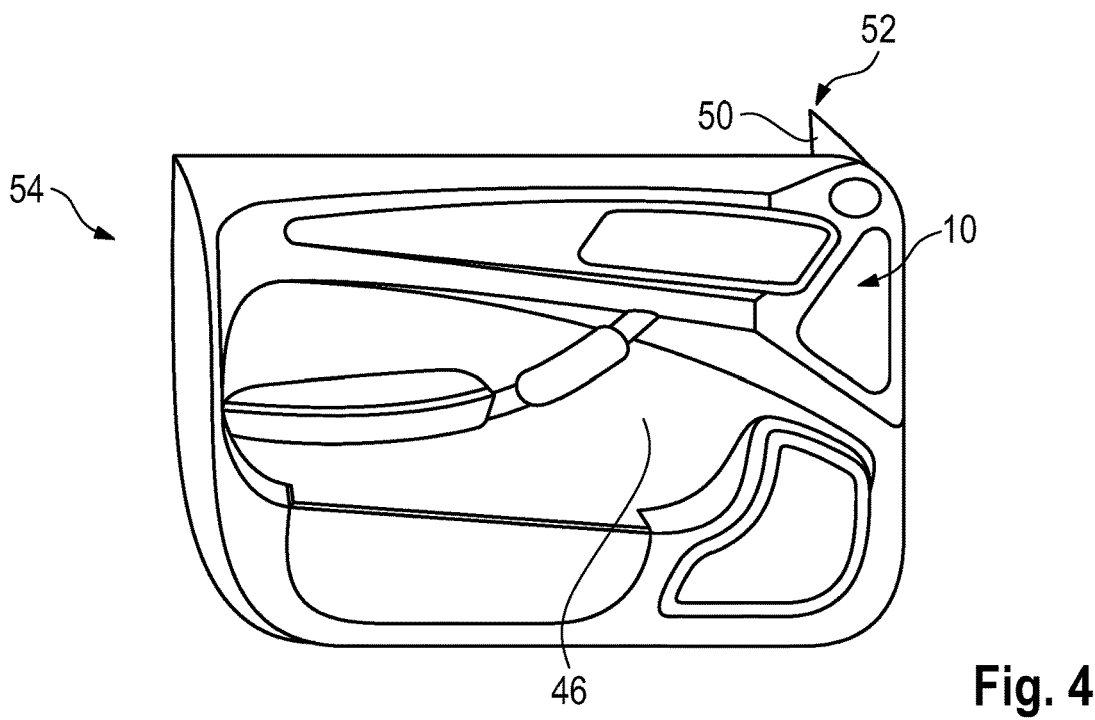
FIG. 4 shows a schematic perspective view of an exemplary use of the trim arrangement from FIG. 1.

FIG. 4 shows an example of a trim that is provided with the trim arrangement 10 for a vehicle interior 16 in the form of a cover 50, which is located in the region of a mirror triangle 52 of a vehicle door 54 and adjoins a door trim 46.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A trim arrangement for a vehicle interior, comprising:
a trim portion having a through-opening for delimiting the vehicle interior;
a light-emitting body inserted into the through-opening, the light-emitting body configured to transmit light and/or light signals into the vehicle interior, wherein the light-emitting body blocks a movement transversely to an opening normal of the through-opening in a form-fitting manner;
a receiving device connected to a rear side of the trim portion, the rear side facing away from the vehicle interior;
a latching body inserted into the receiving device along an insertion direction extending substantially transversely to the opening normal of the through-opening, wherein the receiving device blocks a movement of the latching body in a direction of the opening normal of the through-opening in a form-fitting manner, and
a connecting strip provided on the rear side of the trim portion and extending substantially transversely to the opening normal of the through-opening,
wherein the light-emitting body and the latching body are connected at a distance from one another by the connecting strip, and
wherein the connecting strip is embodied to be elastically bendable in the direction of the opening normal of the through-opening.

2. The trim arrangement as claimed in claim 1, wherein the connecting strip is embodied to be elastically bendable at least by a distance corresponding to an extent by which the light-emitting body is removed from the connecting strip in the direction of the opening normal of the through-opening.

3. The trim arrangement as claimed in claim 1, wherein the latching body is configured to be wedged into the receiving device in the insertion direction in a frictionally locking manner.

4. The trim arrangement as claimed in claim 1, wherein the latching body is lockable substantially immovably by way of a catch in the receiving device.

5. The trim arrangement as claimed in claim 1, wherein the latching body, the connecting strip, the light-emitting body and/or the coupling element are made in one piece from a light-guiding material.

6. The trim arrangement as claimed in claim 1, wherein a light source is coupled to the coupling element.

7. The trim arrangement as claimed in claim 1, wherein the light-emitting body and the coupling element are arranged on the connecting strip such that they lie opposite one another.

8. The trim arrangement as claimed in claim 1, wherein a portion of the connecting strip projects from the light-emitting body on a side that faces away from the latching element.

9. The trim arrangement as claimed in claim 1, wherein the connecting strip and/or the latching body rests flat against the rear side of the trim portion.

10. The trim arrangement as claimed in claim 1, wherein the receiving device blocks a movement of the latching body transversely to the insertion direction.

11. The trim arrangement as claimed in claim 1, wherein the light-emitting body is pressed into the through-opening substantially without play.

* * * * *